July 10, 1934.  I. D. RICHHEIMER  1,965,750
COFFEEPOT
Filed Nov. 5, 1932
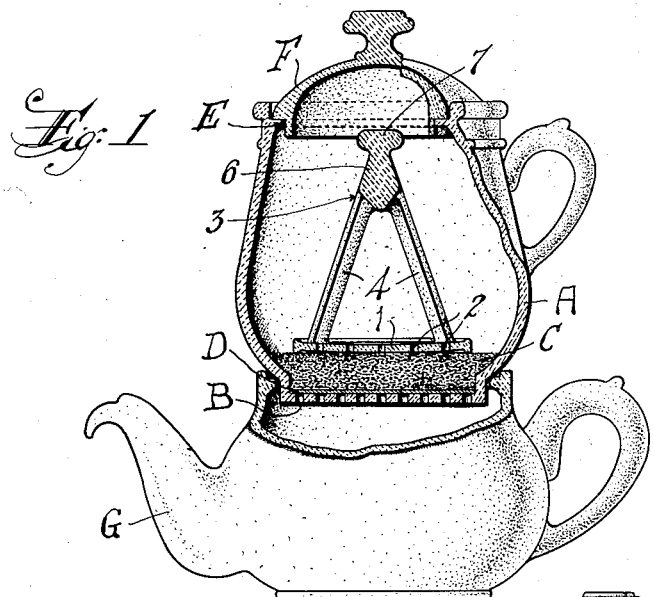
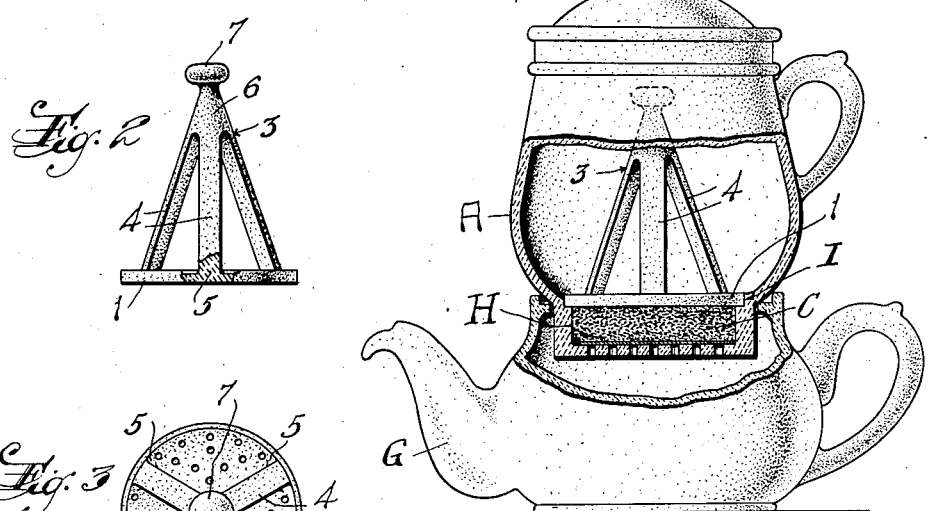
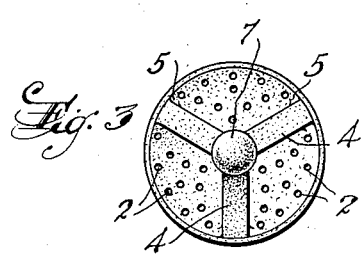
INVENTOR
Isaac D. Richheimer,
BY Harry S. Rook,
ATTORNEY Patented July 10, 1934

1,965,750

UNITED STATES PATENT OFFICE 1,965,750

COFFEEPOT

Isaac D. Richheimer, New York, N. Y.

Application November 5, 1932, Serial No. 641,397

4 Claims. (Cl. 53—3)

This invention relates in general to coffee making apparatus of the type wherein the ground coffee is placed in a receptacle having a perforate bottom, and hot water is poured over the coffee and permitted to trickle therethrough. Such apparatus usually includes a device for retaining the ground coffee at the bottom of the receptacle and against floating in the water, and said device in many instances also is utilized to spread the hot water over the ground coffee.

Many coffee retainers and water spreaders of this character are made of metal, while others are made of glass, ceramic materials, such as porcelain and china, or similar plastic materials, the latter especially where the devices are to be used in ceramic or earthenware coffee making apparatus.

These coffee retainers and water spreaders generally comprise a flat or disc-like body to rest upon the ground coffee, and handles for placing and removing them in and from the receptacles, respectively. The receptacles are usually deep, the coffee is placed in a layer at the bottom of the receptacles, and it is difficult, as well as dangerous when the receptacle is hot, to insert the hand into the receptacle for manipulating the device. Therefore, these handles to be desirable and effective, must be long and project considerable distances from the disc-like bodies so that the devices can be placed easily in the receptacles without inserting the hands into the receptacles and without danger of accidentally dropping the devices into the receptacles. Long and durable handles can be easily provided on metal devices, but metal coffee retainers are undesirable especially in ceramic receptacles. On the other hand, while ceramic, glass and like coffee retainers are desirable, it has been found that long handles of known types for such coffee retainers are not practicable because the handles can be broken easily under impacts during handling and the long handles are easily cracked by expansion and contraction of the materials when subjected to original firing in the film, and also when hot water is poured thereon and when suddenly cooled, respectively, especially adjacent the points where the handles are joined to the disc-like bodies. Therefore, it has been the general practice to make glass, ceramic and similar coffee retainers with short handles or knobs which are objectionable because of the difficulty in placing them in and removing them from the receptacles.

For convenience in terminology the term "plastic material" will be hereinafter used to include glass, ceramic materials and the like suitable for use as coffee retainers and water spreaders and the like.

The primary object of my invention is to provide a coffee retainer and water spreader formed of plastic material and including a novel and improved handle which shall be of sufficient length for convenient insertion and removal of the device into and from the receptacle, respectively, and yet shall effectually resist breaking or cracking from expansion and contraction under heating and cooling and from the rough handling of the device.

Other objects are to provide plastic or earthenware coffee retainer and water spreader comprising a disc-like body and a handle including a plurality of arms so constructed and arranged relatively to each other and to the disc-like body that heat may be quickly dissipated and will be widely distributed in its transmission from the disc-like body to the handle; to provide such a coffee retainer and water spreader wherein the handle has a plurality of arms so related to each other and to the disc like body that the weight of the device shall be evenly distributed and the disc like body shall have a balanced relation to the handle to facilitate manipulation of the device and reduce possibility of injury thereto by dropping thereof from or uneven balance thereof in the hands of the user; and to obtain other advantages and results as will be brought out by the following description.

Referring to the accompanying drawing in which corresponding and like parts are designated throughout the drawing by the same reference characters, Figure 1 is a side elevation, partially in vertical longitudinal section, of a coffee making apparatus including a coffee retainer and water spreader embodying my invention.

Figure 2 is a side elevation of the coffee retainer and water spreader.

Figure 3 is a top plan view thereof, and

Figure 4 is a view similar to Figure 1 showing a modified form of coffee making apparatus with which my coffee retainer and water spreader may be used.

Specifically describing the invention, my coffee retainer and water spreader comprises a disc-like body 1, preferably circular in plan and formed of plastic material such as glass, ceramic material, and the like. This body 1 has a plurality of transverse perforations 2 for the passage of water therethrough.

Connected to one side of the body 1 is a handle 3 which comprises a plurality of arms 4 of plastic material which are connected at one end integrally or in direct heat conducting relation to one side of the body, as at 5, in equidistantly spaced relation to each other and equidistantly from the center or axis of the body 1. These arms 4 project from said side of the body, converge toward each other and are connected at their other ends as indicated at 6. Preferably, as shown, the arms are merged together or are integrally connected, and have a common knob or finger piece 7. As shown, the outer ends of the arms 4 are connected on substantially the axial line of the disc-like body 1, and the knob 7 is also approximately coaxial with the disc-like body.

If desired, the arms 4 and knob 7 may be made of other than plastic material and the outer ends of the arms might be otherwise than integrally connected, although, the structure embodying the invention is specifically adapted for coffee retainers and water spreaders made wholly of ceramic material, glass or like plastic material.

The coffee retainer and water spreader is intended for use with a known type of coffee making apparatus which includes a coffee receptacle A having a perforate bottom B and in which a layer of ground coffee C is arranged, preferably above a layer of filter paper or the like D which prevents any of the coffee grounds from passing through the perforate bottom B. The receptacle A has a mouth E normally closed with a removable cover F. The coffee retainer and water spreader is inserted through the mouth E of the receptacle and placed upon the top of the coffee C, as shown in Figure 1. The receptacle A is removably set into the open top of a pouring receptacle G, and in making coffee, hot water is poured into the receptacle A over the disc-like body 1 and allowed to trickle through the perforations in the disc-like body and through the coffee into the pouring receptacle G. The coffee retainer and water spreader serves to hold the coffee against rising and scattering in the water in the coffee receptacle and also spreads the water over the coffee. If desired, the top of the knob 7 may also be used to spread the water by directing the stream of water from the tea-kettle or other heating receptacle upon the top of the knob, the knob and the disc-like body thus preventing displacement of the coffee by pouring of the water into the receptacle.

I have found that a coffee retainer and water spreader constructed in this way will effectually withstand heating and cooling without cracking of the handle, so that the handle may be made as long as desired. This is apparently due to the fact that the plurality of arms, being connected to the disc-like body at spaced points, quickly distribute the heat and thereby reduce to a minimum relative expansion and contraction of adjacent portions of the device which would cause cracking. It has been found that a single rod-like handle coaxial with the disc-like body will quickly crack under expansion and contraction from heating and cooling and also is easily broken by blows so that such handles are impracticable.

Another advantage of the construction is that the handle and disc-like body are relatively balanced so that when the device is picked up by the knob 7 the weight is balanced and there is a minimum tendency of the device to twist or turn in the hand in such a manner as to cause dropping of the device.

The device embodying the invention may be made in any suitable manner, and generally the disc-like body 1 and the handle are shaped separately and then connected together by firing of the parts according to the usual method of making ceramic articles. While I have shown the handle as provided with three arms, it is possible to utilize any desired number of arms. Also, while the arms have been shown as straight, the arms may be made of any desired shape.

In some coffee making apparatus as shown in Figure 4, the coffee receptacle A has a reduced bottom extension H which serves as a coffee receiving compartment, and at the juncture of this compartment with the body of the receptacle, a rabbeted seat I is provided for the coffee retainer and water spreader. Obviously, my coffee retainer and water spreader may be utilized with such coffee making apparatus, it being merely necessary to make the disc-like body 1 of a shape and size corresponding to the seat I so that the body will fit into said seat.

Having thus described my invention, what I claim is:

1. A coffee retainer and water spreader for coffee making apparatus, comprising a perforate disc-like body of plastic material, and a handle of plastic material including a plurality of arms connected at one end in direct heat conducting relation to one side of said body in equidistantly spaced relation circumferentially of said body, the other ends of said arms being integrally connected on substantially the axial line of said body.

2. The combination with a receptacle for ground coffee having an open top and a perforate bottom, of a perforate disc-like body of plastic material to be set in said receptacle over the ground coffee for retaining the coffee at the bottom of said receptacle, and a handle of plastic material including a plurality of arms connected at one end to one side of said body in equidistantly spaced relation circumferentially of the body, and a knob connected to the other ends of said arms on substantially the axial line of the body, said arms being of a length to locate said knob adjacent the open top of said receptacle when said disc-like body is set over the ground coffee in the receptacle.

3. A coffee retainer and water spreader for coffee making apparatus, comprising a perforate disc-like body of ceramic material, and a handle of ceramic material including a plurality of arms connected by firing of the material at one end to one side of said body in equidistantly spaced relation circumferentially of said body, the other ends of said arms converging together and having a knob integrally connected thereto on substantially the axial line of said body.

4. A coffee retainer and water spreader for coffee making apparatus, comprising a perforate disc-like body of plastic material, and a handle of plastic material including three arms connected at one end in direct heat conducting relation to said body in equidistantly spaced relation to each other and equidistantly from the center of said body, the other ends of said arms being integrally connected on substantially the axial line of said body and having an integral common knob.

ISAAC D. RICHHEIMER.